April 14, 1931. N. H. NELSON 1,800,654
SPRING ROLLER ASSEMBLY
Original Filed Oct. 7, 1927
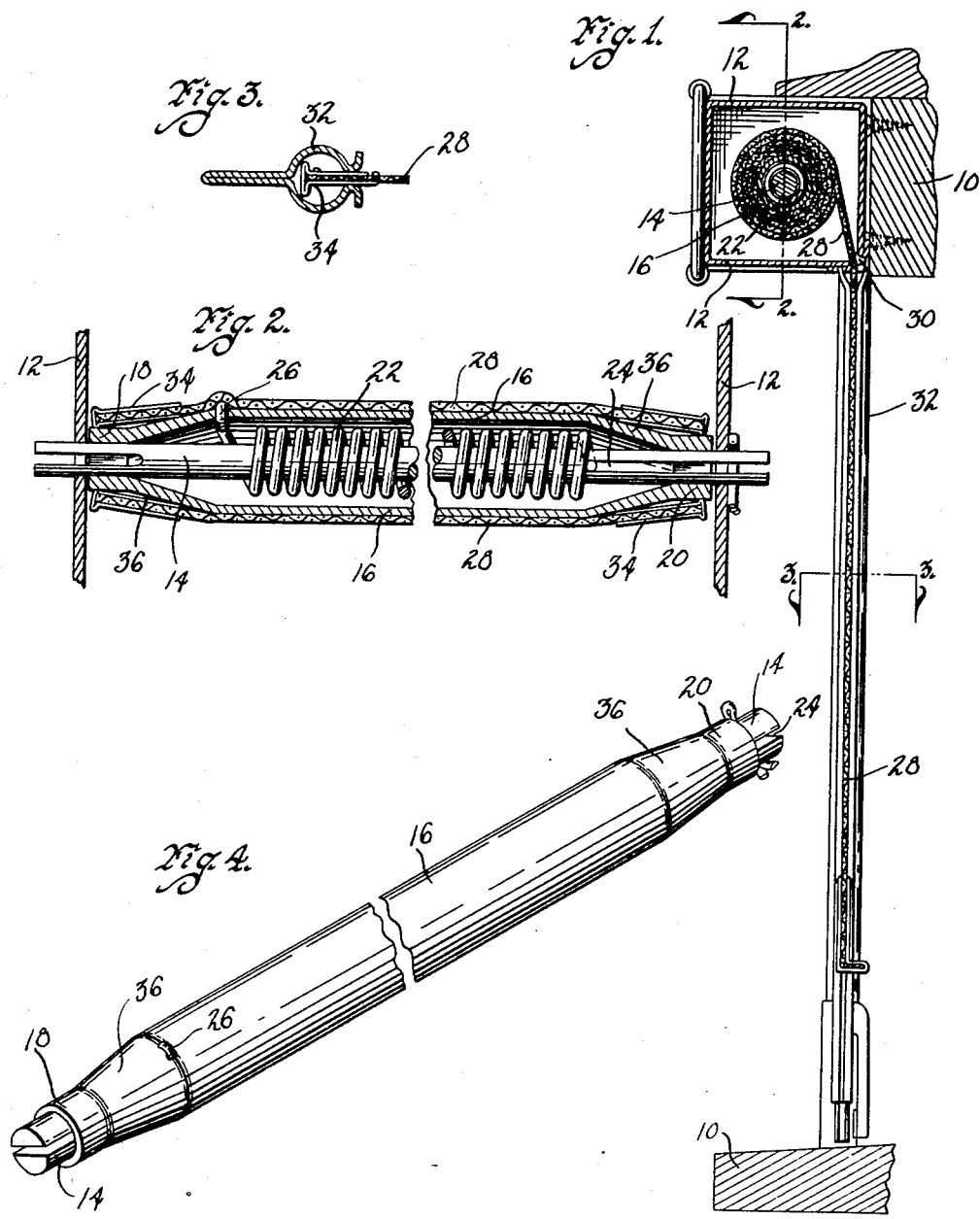

Patented Apr. 14, 1931

1,800,654

UNITED STATES PATENT OFFICE

NELS H. NELSON, OF ARNOLDS PARK, IOWA, ASSIGNOR TO THE ROLSCREEN COMPANY, OF PELLA, IOWA

SPRING-ROLLER ASSEMBLY

Original application filed October 7, 1927, Serial No. 224,602. Divided and this application filed November 7, 1928. Serial No. 317,862.

The subject matter of this application was originally included in, but has been divided from my application on improvement in rolling screens filed October 7, 1927, Serial No. 224,602, patented June 4, 1929, No. 1,715,858.

The object of this invention is to provide an improved spring roller assembly for use with rolling screens, awnings, shades, and curtains, which is simple, durable and comparatively inexpensive to manufacture.

More specifically, the object of this invention is to provide an improved construction for a roller whereby adequate bearings are provided at small expense and at the same time the diameter of the roller at its extreme ends is reduced to accommodate the increased marginal thickness of fabric to be wound thereon, due to the presence of clips or fastening members.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a vertical sectional view showing a window frame equipped with rolling screen with which my improved spring roller is employed.

Figure 2 is a longitudinal section through the roller assembly on the line 2—2 of Figure 1, a portion being broken away to economize space.

Figure 3 is a horizontal section through one of the screen tracks and a portion of the screen on the line 3—3 of Figure 1.

Figure 4 is a perspective view of the roller, a portion being broken away.

My improved spring roller assembly is adapted for use with rolling window screens as shown in the accompanying drawing or with rolling awnings, shades, curtains and the like.

In the accompanying drawing, I have used the numeral 10 to designate generally, a window frame at the upper end of which is mounted a sheet metal housing 12.

Mounted in and centrally of the housing 10 and extending from end to end thereof is a spindle or rod 14 and a tubular sheet metal roller 16 is journaled on said spindle or rod and extends longitudinally of the housing.

The roller 16 preferably is formed of a sheet metal tube of considerably greater diameter than the rod 14 and has its end portions swaged and reduced in diameter to form elongated bearings 18 and 20 which engage and rotate on the rod.

Inasmuch as the swaged portions 18 and 20 are of considerable length, they provide adequate bearings for the roller to resist the tendency to wear or to cut grooves in the rod.

A coil spring 22 is wound on the rod 14 and has one end attached thereto in any suitable manner such as by passing it through a longitudinal slot 24 in the rod.

The opposite end of the spring 22 is attached to the roller 16 at the point 26.

A sheet of fabric such as screen mesh 28 is attached at one of its end margins to the roller 16 and is adapted to be wound thereon and to be extended through a longitudinal slot 30 formed at the lower rear corner of the housing 12.

The fabric which is wound on the roller may in some instances be of canvas or other similar material to form an awning, shade, or curtain.

In the rolling screen construction it is customary to employ guide tracks which are mounted vertically at the side margins of the window frame to receive side marginal portions of the screen 28. One of these tracks is shown in Figures 1 and 3 and designated by the numeral 32.

In such construction, the side margin of the screen projects through a slit opening in the inner face of the guide track and it is customary to employ clips or staples 34 or similar enlarged members at spaced intervals on the side margins of the screen, the function of which is to travel in the guide tracks and normally to prevent withdrawal of the screen therefrom.

When the screen 28 is wound on the roller 16 it is obvious there will be a bunching or piling up which will cause an enlargement of the marginal portions upon the roller.

The formation of my improved roller here shown and described, is designed to compensate for the enlargements at the side marginal portions of the screen and to prevent or at least greatly minimize the tendency to pile up at the end portions of the roller.

In other words, the reduction of diameter at the end portions of the roller 16 provides additional space for the enlarged marginal portions of the screen, due to the presence of the members 34 thereon.

This same advantage is found in the use of the roller with awnings or curtains which may be provided with clips, studs or other fastening means at their side marginal portions.

In the formation of the reduced bearings 18 and 20 at the ends of the rollers 16, there is preferably a gradual tapering or reducing in diameter, as indicated respectively by the numeral 36.

This formation is of especial convenience in compensating for clips 34 of the nature shown in Figures 2 and 3, which have their greatest thickness located near the extreme outer edge of the fabric.

I claim as my invention:

1. In a device of the class described, a spindle, and a tubular roller arranged for rotation on said spindle, said roller being of materially greater diameter than said spindle and having its end portions reduced both internally and externally to form elongated bearing portions fitted to said spindle and also to accommodate thickened marginal portions of a fabric to be wound on the roller.

2. A roller assembly comprising a rod, a tubular roller of materially greater diameter than said rod, the end portions of said roller being reduced in diameter to form elongated bearings journaled on said rod.

3. A roller assembly comprising a rod, a tubular roller of materially greater diameter than said rod, the end portions of said roller being reduced in diameter to form elongated bearings journaled on said rod, said reduced bearing portions being connected to the body portion of the roller by intermediate tapered portions.

Des Moines, Iowa, October 20, 1928.

NELS H. NELSON.